Patented May 16, 1933

1,908,904

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

NEW VAT DYESTUFFS OF THE DIBENZANTHRONE SERIES

No Drawing. Application filed December 21, 1929, Serial No. 415,784, and in Germany April 8, 1927.

This invention relates to the production of new vat dyestuffs. We have found that new valuable vat dyestuffs are obtained by condensing vat dyestuffs which contain the pyrenequinone system and which contain a plurality of negative substituents with only so much of a dibenzanthrone containing at least one nitrogen atom having a reactive hydrogen atom attached thereto as to produce compounds which still contain negative substituents. As regards the nitrogenous dibenzanthrones, preferably aminodibenzanthrone or derivatives or homologues thereof, in which one hydrogen atom of the amino group may be replaced by a low alkyl radicle, such as a methyl, ethyl or propyl group, are employed for the condensation. The negative substituents in the other components may be, for example, halogen atoms or nitro groups. Suitable compounds of the said class are, for example, pyrenequinones, such as dibenzopyrenequinones, anthanthrones, iso-amphi-pyranthrones and the like, containing several negative substituents. The said dyestuffs probably correspond to the general formula

where R stands for a dibenzanthrone radicle, R₁ stands for the radicle of a vat dyestuff containing the pyrenequinone system, which radicle contains at least one negative substituent and which may be substituted, for example, by further radicles of the type

and X stands for hydrogen or a low alkyl radicle.

The condensation is preferably carried out in solvents or diluting media of high boiling point, such as nitrobenzene, naphthalene or quinoline, and acid-fixing agents, for example, the alkali metal salts of weak acids, such as sodium acetate, or the alkaline earth metal oxides and catalysts, such as copper or its compounds, are preferably added. Excellent yields of the new dyestuffs are obtained.

The reaction products dissolve in concentrated sulphuric acid usually to a violent solution. They dye cotton from usually blue vats grey to black shades of excellent fastness.

In the above described condensation process nitro compounds of dibenzanthrones may be used as the nitrogenous component if a reducing agent, such as hydrazine hydrate or sulphur and the like, be added to the reaction mixture.

The following examples will further illustrate the nature of this invention, but the invention is not restricted thereto. The parts are by weight.

Example 1

9.8 parts of dibrom-3.4.8.9-dibenzopyrene-5.10-quinone, obtainable by brominating 3.4.8.9-dibenzopyrene-5.10-quinone in chlorosulphonic acid in the presence of iodine, are boiled in 250 parts of nitrobenzene with 10 parts of sodium acetate, 2 parts of copper oxide and 9.4 parts of aminodibenzanthrone while stirring, until unaltered aminodibenzanthrone can no longer be detected. The reaction product can be worked up by filtration by suction or by distilling off the solvent, if desired with the aid of reduced pressure or of steam or of both. The dyestuff probably corresponding to the formula

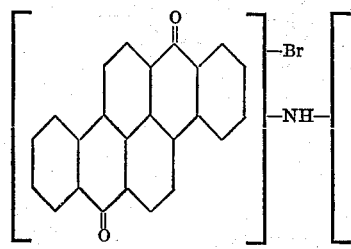 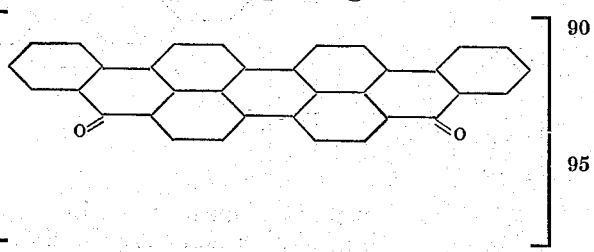

is a black powder dissolving with a reddish violet coloration in concentrated sulphuric acid and dyeing cotton olive-grey shades from a bluish violet vat.

*Example 2*

52 parts of dibrom-monochlor-4.5.8.9-dibenzopyrene-3.10-quinone, obtainable by brominating 4.5.8.9-dibenzopyrene-3.10-quinone, in nitrobenzene and then chlorinating in nitrobenzene with sulphuryl chloride, are boiled in 500 parts of nitrobenzene with 40 parts of sodium acetate, 0.5 part of copper oxide and 94 parts of aminodibenzanthrone while stirring, until unaltered aminodibenzanthrone can no longer be detected. The mass is worked up as described in Example 1. The resulting dyestuff which probably corresponds to the formula

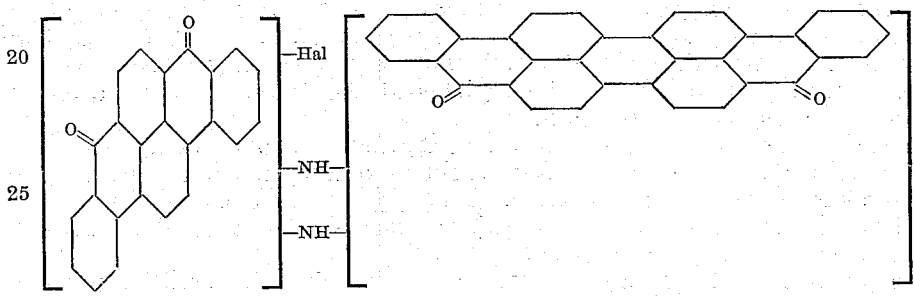

dissolves in concentrated sulphuric acid with a brownish red coloration and dyes cotton from a blue vat bluish grey shades of excellent fastness.

*Example 3*

92 parts of dibromanthanthrone, obtainable by brominating anthanthrone in 6 per cent fuming sulphuric acid, are boiled in 1250 parts of nitrobenzene with 50 parts of sodium acetate, 2 parts of copper oxide and 94 parts of aminodibenzanthrone while stirring, until unaltered aminodibenzanthrone can no longer be detected. The mass is worked up in the usual manner. The dyestuff of which an excellent yield is obtained, dissolves with a violet coloration in concentrated sulphuric acid and dyes the vegetable fiber strong grey shades from a blue vat. The product probably corresponds to the formula

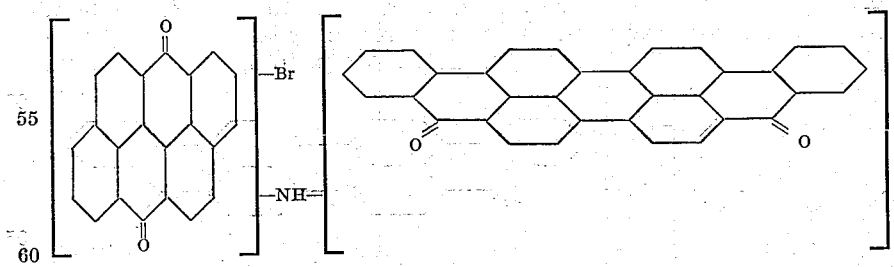

This application is a continuation in part of our copending application Ser. No. 267,478, filed April 4th, 1928.

What we claim is:—

1. The process of producing new valuable vat dyestuffs which comprises condensing a vat dyestuff containing the pyrene-quinone system and containing a plurality of substituents selected from the group consisting of halogen and the nitro group with only so much of a dibenzanthrone containing at least one nitrogen atom having a reactive hydrogen atom attached thereto as to produce a condensation product still containing at least one substituent selected from the group consisting of halogen and the nitro group.

2. The process of producing new valuable vat dyestuffs which comprises condensing a vat dyestuff containing the pyrene-quinone system and containing a plurality of substituents selected from the group consisting of halogen and the nitro group with only so much of a dibenzanthrone containing at least one nitrogen atom having a reactive hydrogen atom attached thereto as to produce a condensation product still containing at least one substituent selected from the group consisting of halogen and the nitro group, in the presence of an inert organic diluent of high boiling point.

3. The process of producing new valuable vat dyestuffs which comprises condensing a vat dyestuff containing the pyrene-quinone system and containing a plurality of substituents selected from the group consisting of halogen and the nitro group with only so much of a dibenzanthrone containing at least one nitrogen atom having a reactive hydrogen atom attached thereto as to produce a condensation product still containing at least one substituent selected from the group consisting of halogen and the nitro group in the presence of an acid fixing agent.

4. The process of producing new valuable vat dyestuffs which comprises condensing a vat dyestuff containing the pyrene-quinone system and containing a plurality of substituents selected from the group consisting of halogen and the nitro group with only so much of a dibenzanthrone containing at least one nitrogen atom having a reactive hydrogen atom attached thereto as to produce a condensation product still containing at least one substituent, selected from the group consisting of halogen and the nitro group in the presence of a copper compound.

5. As new articles of manufacture grey to black vat dyestuffs giving bluish vats and violet solutions in concentrated sulphuric acid, the said dyestuffs probably corresponding to the general formula

in which R stands for a dibenzanthrone radicle, $R_1$ stands for the radicle of a vat dyestuff containing the pyrene-quinone system and containing at least one substituent selected from the group consisting of halogen and the nitro group, and X stands for hydrogen or a low alkyl radicle.

6. As new articles of manufacture grey to black vat dyestuffs giving bluish vats and violet solutions in concentrated sulphuric acid, the said dyestuffs probably corresponding to the general formula

in which R stands for a dibenzanthrone radicle, $R_1$ stands for the radicle of a vat dyestuff containing the pyrene-quinone system and containing at least one substituent selected from the group consisting of halogen and the nitro group, which is substituted by at least one further radicle of the type

and X stands for hydrogen or a low alkyl radicle.

7. As a new article of manufacture the vat dyestuff probably corresponding to the formula

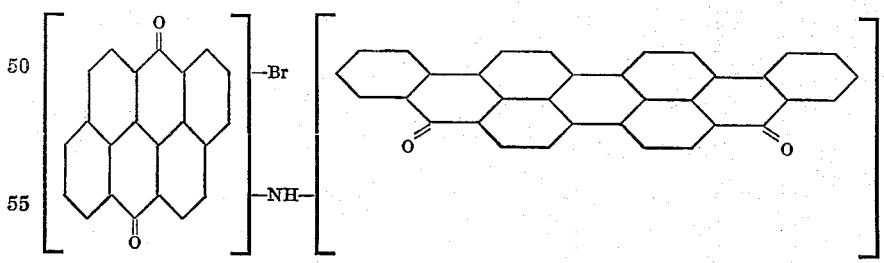

which dissolves with a violet coloration in concentrated sulphuric acid and dyes the vegetable fiber strong grey shades from a blue vat.

In testimony whereof we have hereunto set our hands.

MAX ALBERT KUNZ.
KARL KOEBERLE.